Sept. 23, 1924.                                                                1,509,570
                              W. H. SYKES
                    SWIVEL CONNECTER FOR KEY CHAINS
                        Filed April 14, 1924
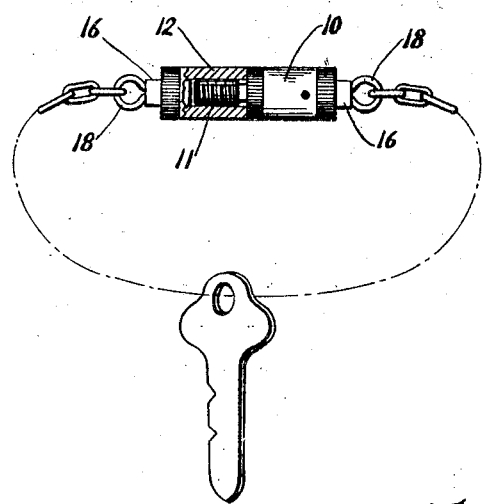
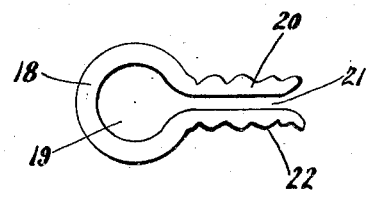 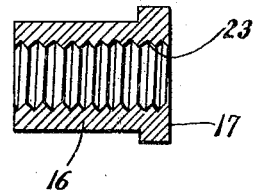
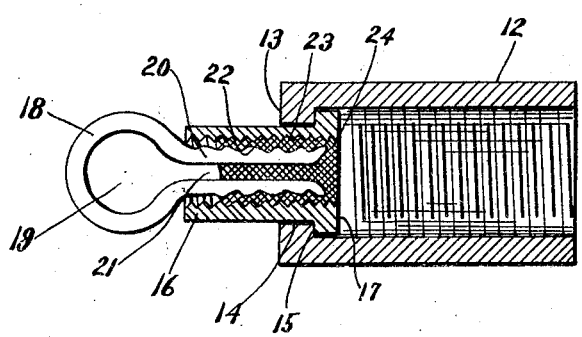
Inventor
William H. Sykes
By Barlow & Barlow
Attorneys Patented Sept. 23, 1924.

1,509,570

UNITED STATES PATENT OFFICE.

WILLIAM H. SYKES, OF EDGEWOOD, RHODE ISLAND, ASSIGNOR TO LIVERMORE & KNIGHT CO., OF PROVIDENCE, RHODE ISLAND, A CORPORATION OF RHODE ISLAND.

SWIVEL CONNECTER FOR KEY CHAINS.

Application filed April 14, 1924. Serial No. 706,400.

*To all whom it may concern:*

Be it known that I, WILLIAM H. SYKES, a citizen of the United States, residing at Edgewood, in the county of Providence and State of Rhode Island, have invented certain new and useful Improvements in Swivel Connecters for Key Chains, of which the following is a specification.

This invention relates to an improved construction of swivel connecter for key chains and the like; and the object of this invention is to provide an improved construction of swivel in a key chain and the like, by which the eye-member of the swivel may be securely locked in the body of the swivel member and effectually prevented from being withdrawn therefrom when subjected to unusual strains.

With these and other objects in view, the invention consists of certain novel features of construction, as will be more fully described, and particularly pointed out in the appended claims.

In the accompanying drawings:

Figure 1 is a side elevation showing my improved connecter with one of the members partly in section.

Figure 2 is an enlarged view of the eye-member and showing the shank with roughened surfaces.

Figure 3 is a sectional view of the swivel member and showing its central bore roughened or corrugated to cooperate with a roughened surface on the eye-shank to prevent these members from being withdrawn when soldered together.

Figure 4 is a sectional side elevation showing the shank of the eye-member as soldered into the swivel member, the head of the latter member being held in the bore of the body of one of the connecter members.

It is found in the practical construction and operation of swivel connecters of this character, especially for key chains, that where an eye-member having a smooth shank is soldered into a swivel member having a smooth bore the solder which is inserted into the bore of the swivel member after this member is inserted into its body member, sometimes fails to sufficiently connect the shank to the surface of the bore to securely bind or lock these members together, and to obviate this difficulty, I have corrugated or roughened both the inner surface of the bore and the outer surface of the shank members so that when solder is applied thereto these members are locked together and cannot be drawn apart even by unusual strain on the key chain; and the following is a detailed description of one construction by which this advantageous result may be accomplished:—

With reference to the drawing, 10 designates one member of a swivel connecter which is provided with a screw 11 seated into the bore of a socket member 12 of the connecter.

This socket member is provided with an end wall 13 through which is formed a central opening 14 thereby providing a shoulder 15 on the interior thereof.

In this socket member, I have mounted a swivel member 16 which is preferably of tubular form and is provided with a flange 17 which forms a shoulder to engage a shoulder 15 on the inner surface of this socket member.

The body portion of this swivel extends outwardly through an opening in the socket member and an eye-member 18 is preferably formed of wire bent into loop form as at 19 having a peripheral diameter greater than that of the opening in said socket and is provided with shank members 20 extending into the central bore of the swivel member 16.

These shank members 20 are preferably spaced slightly apart as at 21 and are roughened or notched as at 22 on their outer surfaces and the inner surface 23 of the swivel member 16 is corrugated or roughened on its inner surface whereby when solder or cement 24 is inserted into the bore of this swivel member, it enters between the inner roughened wall of the swivel member and the outer roughened surface of the shank members. Also it enters into the space 21 between the shank members 20 thereby locking the shank members against being compressed toward each other to release their outer surfaces, thus securely and positively locking the shank portions of the eye member in the bore of the swivel member.

In assembling these parts, the swivel member is entered into the socket member, its head 17 engages the shoulder 15 of the socket member and its body portion extends out through the opening 14 therein. The shanks of the eye-member are then inserted into the central bore of the protruding outer end of the swivel, solder is now dropped into this central bore of the socket 12 into the space about the parts of the swivel member, and the solder enters about these parts and when hardened securely locks these parts together. Therefore, by my improved construction of eye member and swivel member in which both have roughened contiguous surfaces, when solder is inserted about these surfaces the members are securely locked together and cannot be pulled apart even by an unusual strain upon the chain fastened thereto.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A swivel connecter for key chains comprising a body member with a central bore and having an end wall with an opening therethrough of a diameter less than that of said bore forming a shoulder therein, a tubular swivel member having an enlargement shouldered against the inner surface of said bore to freely rotate therein and having a body portion extending out through said opening, and an eye-member having a shank portion extending into and soldered in the bore of said tube, both said shank and bore of the tube having contiguous roughened surfaces for receiving the solder into the opposite interstices to lock the parts together.

2. A swivel connecter for key chains comprising a body member with a central bore and having an end wall with an opening therethrough, a tubular swivel member extending through said opening and enlarged on its inner end to shoulder against the inner surface of said end wall, an eye member formed of wire folded upon itself into loop form with its ends slightly spaced apart and extending into the bore of said swivel member, the contiguous surfaces of both said shank and bore of said swivel member being roughened and soldered together, solder being also positioned in the space between the members of said shank to prevent them from springing inwardly under tension.

In testimony whereof I affix my signature.

WILLIAM H. SYKES.